(12) United States Patent
Thielert

(10) Patent No.: US 8,137,634 B2
(45) Date of Patent: Mar. 20, 2012

(54) FISSION REACTOR FOR A CLAUS PLANT

(75) Inventor: Holger Thielert, Dortmund (DE)

(73) Assignee: Uhde GmbH, Dortmund (DE)

( * ) Notice: Subject to any disclaimer, the term of this patent is extended or adjusted under 35 U.S.C. 154(b) by 1264 days.

(21) Appl. No.: 10/520,853

(22) PCT Filed: May 10, 2003

(86) PCT No.: PCT/EP03/04898
§ 371 (c)(1),
(2), (4) Date: Jan. 10, 2005

(87) PCT Pub. No.: WO2004/014791
PCT Pub. Date: Feb. 19, 2004

(65) Prior Publication Data
US 2005/0238552 A1 Oct. 27, 2005

(30) Foreign Application Priority Data
Jul. 25, 2002 (DE) .................. 102 33 820

(51) Int. Cl.
*B01D 50/00* (2006.01)
*C01B 17/02* (2006.01)

(52) U.S. Cl. ...... 422/177; 422/168; 423/571; 423/573.1

(58) Field of Classification Search ............ 422/177
See application file for complete search history.

(56) References Cited

U.S. PATENT DOCUMENTS

| | | | |
|---|---|---|---|
| 3,767,766 A | | 10/1973 | Tjoa et al. |
| 3,822,337 A | * | 7/1974 | Wunderlich et al. ......... 423/224 |
| 4,501,725 A | | 2/1985 | Lell ............................. 423/574.1 |
| 4,597,788 A | * | 7/1986 | Apffel ............................. 62/623 |
| 4,741,515 A | * | 5/1988 | Sharma et al. ................ 266/266 |
| 5,100,640 A | | 3/1992 | Dittmer et al. |
| 5,137,602 A | * | 8/1992 | Stewen et al. ................... 201/41 |
| 5,169,604 A | * | 12/1992 | Crothers, Jr. .................. 422/177 |
| 5,494,003 A | * | 2/1996 | Bartz et al. ................. 122/18.31 |

(Continued)

FOREIGN PATENT DOCUMENTS

DE  37 08 957 A  10/1988

(Continued)

OTHER PUBLICATIONS

JPO Machine Translation of JP 06200354 A (Oct. 17, 2009).*

(Continued)

*Primary Examiner* — Matthew Merkling
(74) *Attorney, Agent, or Firm* — Collard & Roe, P.C.

(57) ABSTRACT

The invention relates to a fission reactor (1) for a Claus plant, comprising a fireproof lined boiler (9), which contains a combustion chamber (2) with an influx opening for a mixture of fuel gas, air and acid gas containing $H_2S$, a catalyst chamber (10) with a catalyst bed and a chamber on the outflow side (11) comprising a gas outlet for a hot process gas that contains elemental sulphur. According to the invention, the boiler is configured as a horizontal cylindrical boiler, in which the combustion chamber (2), the catalyst chamber and the chamber on the outflow side (11) are located next to one another. The catalyst chamber is delimited on both sides in the flow direction by gas-permeable chequer bricks (14) and has a fill opening (15) on the shell side for introducing the catalyst bed.

6 Claims, 2 Drawing Sheets

U.S. PATENT DOCUMENTS

Figure 1:
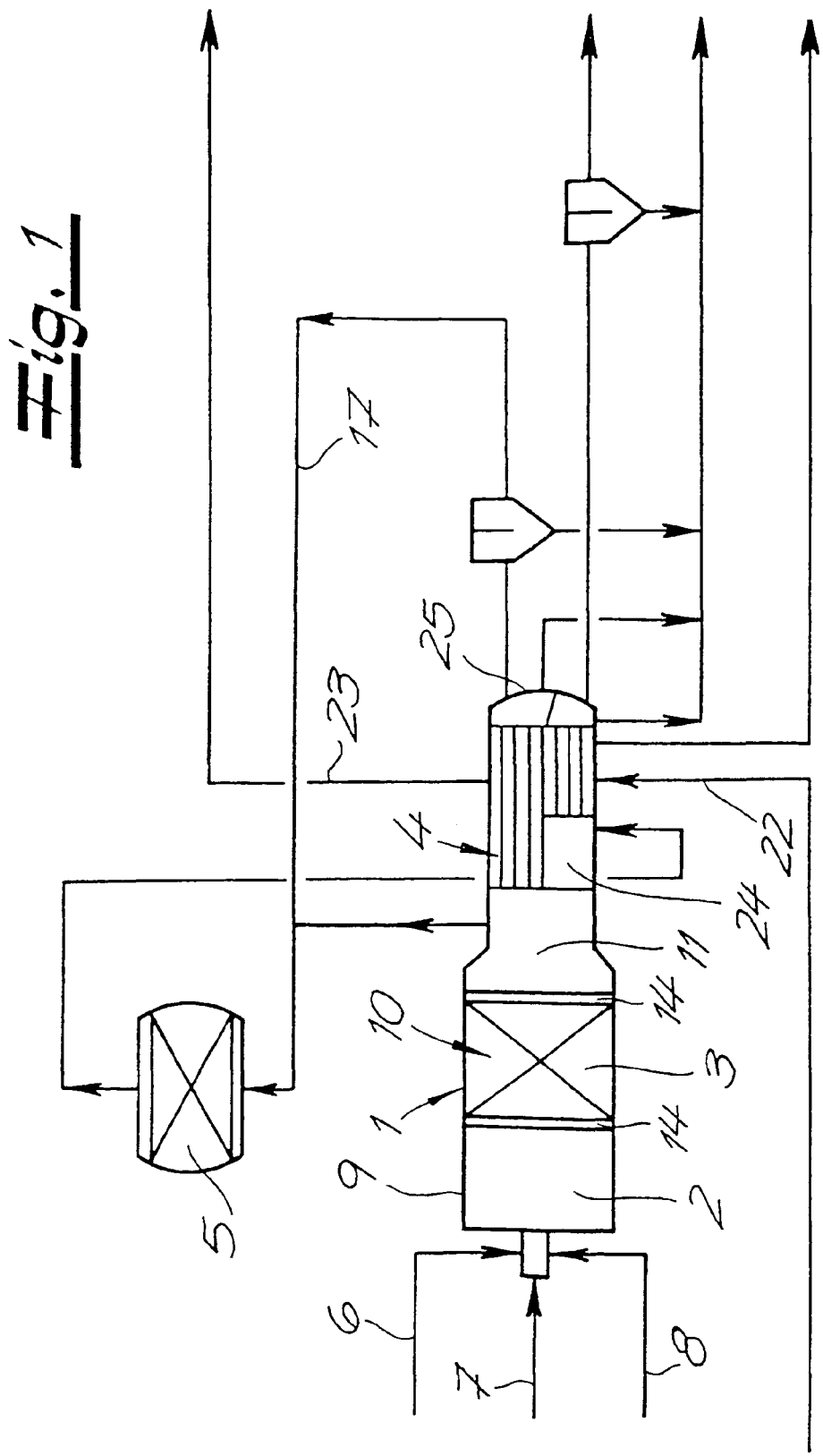

| | | |
|---|---|---|
| 5,628,977 A | 5/1997 | Heisel et al. |
| 5,676,921 A | 10/1997 | Heisel et al. |
| 5,921,079 A * | 7/1999 | Harris .......................... 60/288 |
| 5,935,277 A * | 8/1999 | Autenrieth et al. .......... 48/127.9 |
| 6,280,609 B1 * | 8/2001 | Vora et al. .................... 208/152 |
| 2002/0134706 A1 * | 9/2002 | Keller et al. .................. 208/250 |

FOREIGN PATENT DOCUMENTS

| | | |
|---|---|---|
| DE | 37 08 957 A1 | 10/1988 |
| DE | 38 43 295 | 6/1990 |
| EP | 0 672 618 | 9/1995 |
| EP | 0 811 417 A | 12/1997 |
| EP | 0 811 417 A2 | 12/1997 |
| GB | 769995 | 3/1957 |
| GB | 2221853 A * | 2/1990 |
| JP | 06200354 A * | 7/1994 |
| WO | WO 01 09032 A | 2/2001 |
| WO | WO 01/09032 A1 | 2/2001 |
| WO | WO 01/30692 | 5/2001 |

OTHER PUBLICATIONS

Ullmanns Encyclopedia of Technical Chemistry, vol. 21, 1996, pp. 8-13.

English translation of the International Preliminary Examination Report.

* cited by examiner

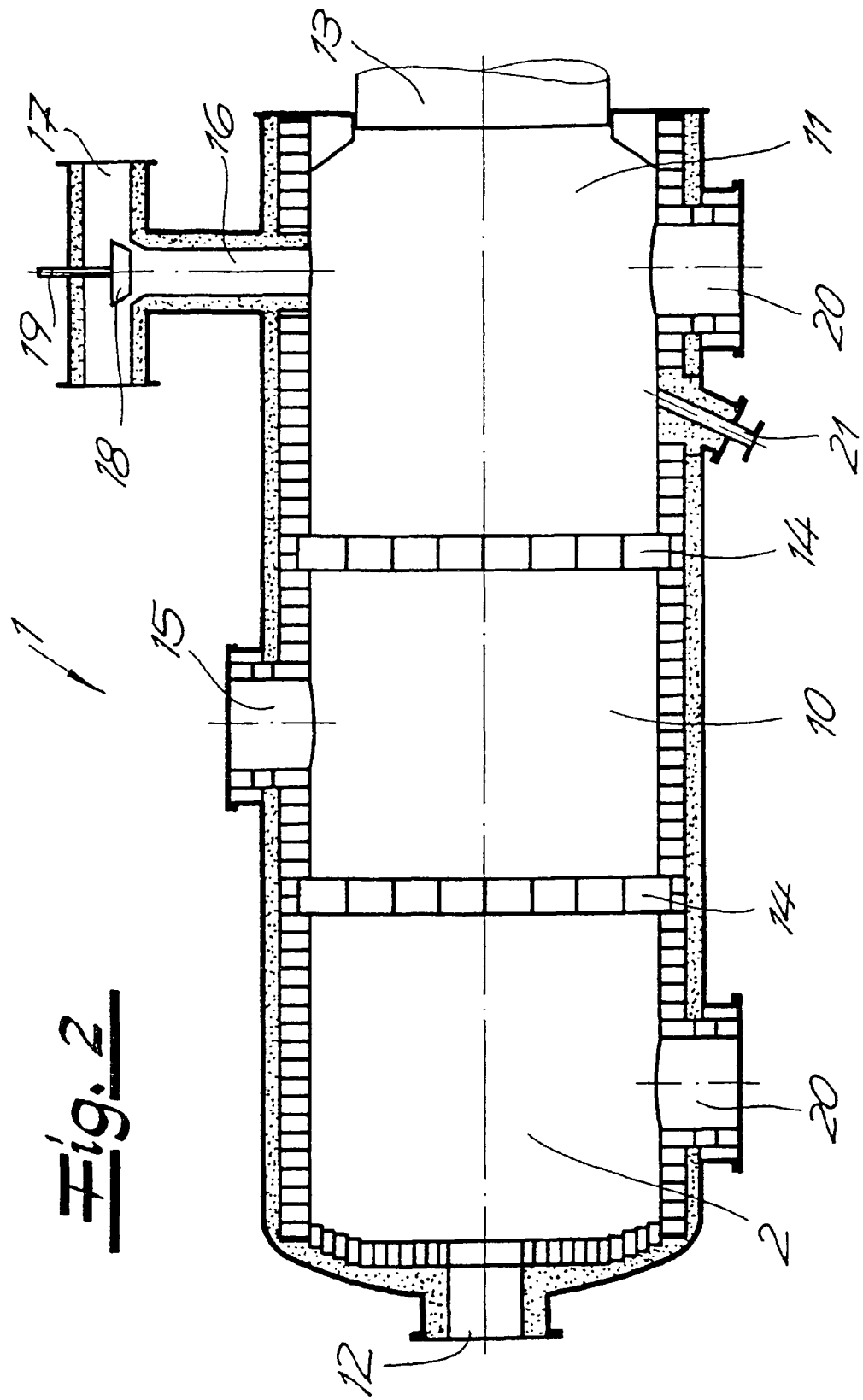

FISSION REACTOR FOR A CLAUS PLANT

CROSS REFERENCE TO RELATED APPLICATIONS

Applicant claims priority under 35 U.S.C. §119 of German Application No. 102 33 820.5 filed Jul. 25, 2002. Applicant also claims priority under 35 U.S.C. §365 of PCT/EP2003/004898 filed May 10, 2003. The international application under PCT article 21(2) was not published in English.

The invention relates to a fission reactor for a Claus plant, comprising a boiler lined with refractory material, which comprises a combustion chamber having an inflow opening for a mixture of heating gas, air and acid gas containing $H_2S$, a catalyst chamber having a catalyst bed, and a chamber on the outflow side, having a gas outlet for hot process gas containing elemental sulfur.

In a Claus plant, hydrogen sulfide is converted to elemental sulfur, which is condensed and precipitated by means of cooling the process gas stream. In its fundamental structure, a Claus plant consists of the fission reactor described initially, a waste heat boiler, as well as at least one catalyst stage. An acid gas containing $H_2S$ is guided into the combustion chamber of the fission reactor, together with air and heating gas. Here, about 60-70% of the hydrogen sulfide is converted to sulfur in an exothermic reaction on the catalyst bed. The process gas leaves the fission reactor at a temperature of about 1200° C., and is cooled to a temperature below 170° C. in the waste heat boiler. After precipitation of the condensed sulfur, the process gas is heated again and passed to the catalyst stage, in which hydrogen sulfide that is still contained in the process gas is converted to elemental sulfur, at a working temperature below 300° C.

Within the scope of the known measures, a vertical shaft oven that has a combustion chamber at its upper end and a bed of a loose catalyst bulk material below the combustion chamber is used as a fission reactor. The oven, through which flow passes from top to bottom, possesses a great height. For reasons of stability, a complicated oven scaffolding is required in order to absorb the wind stress that acts on the oven. Furthermore, there is the problem that flames can flash over from the combustion chamber to the catalyst bed, thereby damaging the catalyst.

The invention is based on the task of reducing the expenditure, in terms of plant technology, for the fission reactor of a Claus plant. The fission reactor is supposed to function reliably, while having a compact structure.

To accomplish this task, the invention teaches that the boiler is configured as a horizontal cylindrical boiler, in which the combustion chamber, the catalyst chamber, and the chamber on the outflow side are disposed next to one another, and that the catalyst chamber is delimited, on both sides, in the flow direction, by gas-permeable checker bricks, and has a fill opening for introducing the catalyst bed, on the mantle side. Preferably, the inflow opening and the gas outlet are disposed on opposite faces of the boiler. The invention is based on the recognition that a horizontal arrangement of the fission reactor can be implemented if the catalyst bed is introduced into a catalyst chamber delimited on both sides by gas-permeable checker bricks. Significant advantages result from the arrangement according to the invention. The fission reactor can be configured to be compact, having a short combustion chamber, since the gas-permeable checker bricks made of a refractory material effectively prevent flash-over of flames from the combustion chamber all the way to the catalyst bed. Furthermore, because of the horizontal arrangement of the boiler, static problems in setting up the fission reactor are eliminated. An oven scaffolding to absorb wind stresses is not necessary. According to a preferred embodiment of the invention, the checker bricks made of refractory material contain elongated holes that cannot become blocked up by the catalysts, which are generally spherical.

In another embodiment of the fission reactor, the invention teaches that on the circumference of the chamber on the outflow side, a branch line lined with refractory material is connected, which opens into a process gas line adjacent to the boiler, through which a cooler process gas flows. In the opening region of the branch line, a valve body is disposed in adjustable manner, with which the amount flow of a hot gas stream that exits from the branch line can be regulated. In this connection, the cooler process gas that passes through the process gas line cools the valve body and a setting device assigned to the valve body, so that usual metallic materials can be used for the valve body and the setting device.

Other embodiments are described in the subordinate claim 5 and are described in the following, using an exemplary embodiment. The drawing schematically shows:

FIG. 1 a Claus plant having a fission reactor configured according to the invention, FIG. 2 the fission reactor in a representation that is enlarged as compared with FIG. 1.

Hydrogen sulfide is converted to elemental sulfur in the Claus plant shown in FIG. 1. The fundamental structure of the plant includes a fission reactor 1 having a combustion chamber 2 and a catalyst bed 3, a waste heat boiler 4 connected with the gas outlet of the fission reactor 1, as well as at least one catalyst stage 5. An acid gas 6 containing hydrogen sulfide, along with air 7 and heating gas 8, is introduced into the combustion chamber 2 of the fission reactor 1. In an exothermic reaction, part of the hydrogen sulfide is converted to elemental sulfur on the catalyst. The process gas leaves the fission reactor 1 at a temperature of approximately 1200° C., and is cooled to a temperature of less than 170° C., which is required for condensation of the sulfur, in the waste heat boiler 4. The condensing sulfur is precipitated. After precipitation of the sulfur, the cooled process gas is heated and passed to the catalyst stage 5, in which sulfur compounds are converted to elemental sulfur on a catalyst. The catalyst stage 5 is operated at a temperature of less than 300° C. The process gas leaving the catalyst stage 5 is also cooled to the temperature required for condensation of the sulfur, in the waste heat boiler 4, and the condensed sulfur is precipitated.

It is evident from a comparison of FIGS. 1 and 2 that the fission reactor 1 consists of a horizontal, cylindrical boiler 9, lined with refractory material, in which boiler the combustion chamber 2, a catalyst chamber 10 for the catalyst bed 3, as well as a chamber 11 on the outflow side are disposed next to one another. An inflow opening 12 for a mixture of heating gas, air, and acid gas containing $H_2S$, as well as a gas outlet 13 for a hot process gas containing elemental sulfur are disposed on the opposite faces of the boiler 9. The catalyst chamber 10 is delimited, on both sides, by gas-permeable checker bricks 14 made of refractory material, and has a mantle-side fill opening 15 for introduction of the catalyst bed. It is practical if the checker bricks 14 contain elongated holes. A branch line 16 lined with refractory material is connected on the circumference of the chamber on the outflow side, which line opens into a process gas line 17 adjacent to the boiler. The process gas line 17 connects the gas outlet of the waste heat boiler 4 with the catalyst stage 5, and has a process gas flowing through it, which exits from the waste heat boiler 4 at a temperature of less than 170° C., and is heated to a working temperature between 210° C. and 250° C. before entry into the catalyst stage 5. The heating takes place by mixing in hot process gas that flows in through the branch line 16. In the opening region of the branch line 16, a valve body 18 is disposed, in adjustable manner, with which the amount flow of the hot gas stream exiting from the branch line 16 can be regulated. The valve body 18 and a setting device 19 assigned to the valve body are cooled by the cooler process gas that flows through the process gas line 17, so that usual metallic materials can be used.

The fission reactor furthermore has cleaning and inspection openings 20, as well as an access 21 for a temperature measurement device.

The waste heat boiler 4 has a steam generator chamber surrounded by a pressure-resistant mantle, to which chamber a feed device 22 for boiler feed water as well as an exhaust device 23 for low-tension steam are connected. The waste heat boiler 4 contains a long tube bundle of heat exchanger tubes, which extend through the steam generator chamber and are inserted, on both ends, into tube plates that delimit the steam generator chamber. Furthermore, at least one additional tube bundle of shorter heat exchanger tubes is provided, which are also inserted into the tube plate at their exit-side end, and open into an inflow chamber 24 at the entry-side end. The long tube bundle has a hot process gas that exits from the fission reactor flowing through it. The inflow chamber 24 is disposed within the steam generator chamber and is impacted by a cooler process gas from the catalyst stage 5. The waste heat boiler 4 furthermore has a head piece 25 that follows the tube plate on the exit-side end, and is divided into sections. Each section of the head piece 25 has a tube bundle assigned to it, in each instance. Devices for drawing off condensed sulfur are connected with the sections.

The invention claimed is:

1. Fission reactor for a Claus plant, comprising a boiler (9) lined with refractory material, which comprises a combustion chamber (2) having an inflow opening (12) for a mixture of heating gas, air and acid gas containing $H_2S$, a catalyst chamber (10) having a catalyst bed (3) of a loose catalyst bulk material, and an outflow-side chamber (11) having a gas outlet (13) for hot process gas containing elemental sulfur, wherein the boiler (9) is configured as a horizontal cylindrical boiler, in which the combustion chamber (2), the catalyst chamber (10), and the outflow-side chamber (11) are disposed next to one another, and wherein the catalyst chamber (10) is delimited, on both sides, in the flow direction, by a plurality of gas-permeable checker bricks (14) containing elongated holes, and has a mantle-side fill opening (15) disposed between the gas-permeable checker bricks (14) for introducing the catalyst bed (3).

2. Fission reactor as claimed in claim 1, wherein the inflow opening (12) and the gas outlet (13) are disposed on opposite faces of the boiler (9).

3. Fission reactor as claimed in claim 1, wherein on the circumference of the outflow-side chamber (11), a branch line (16) lined with refractory material is connected, which opens into a process gas line (17) adjacent to the boiler (9), in the opening region of the branch line (16), a valve body (18) is disposed in adjustable manner, with which the amount flow of a hot gas stream that exits from the branch line (16) can be regulated, and a cooler process gas passes through the process gas line (17), which cools the valve body (18) and a setting device (19) assigned to the valve body.

4. Fission reactor as claimed in claim 3, wherein a waste heat boiler (4) is connected with the gas outlet (13), in which the hot process gas that exits from the boiler (9) is cooled for the condensation of elemental sulfur, and steam is generated, and wherein the branch line (16) opens into a process gas line (17) that is connected with the waste heat boiler (4) and passes the cooled process gas to a catalyst stage (5) of the Claus plant.

5. Fission reactor as claimed in claim 3, wherein said valve body and said setting device consist of metallic material.

6. Fission reactor as claimed in claim 1, wherein said mantle-side fill opening comprises a flange tube.

* * * * *